US011904866B2

(12) United States Patent
Farooq et al.

(10) Patent No.: US 11,904,866 B2
(45) Date of Patent: Feb. 20, 2024

(54) SYSTEMS AND METHODS FOR BRAIN-MACHINE INTERFACES AND EEG-BASED DRIVER IDENTIFICATION

(71) Applicant: Toyota Motor Engineering & Manufacturing North America, Inc., Plano, TX (US)

(72) Inventors: Muhamed Kusay Farooq, Dearborn, MI (US); Chungchih Chou, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 151 days.

(21) Appl. No.: 16/776,699

(22) Filed: Jan. 30, 2020

(65) Prior Publication Data
US 2021/0031778 A1 Feb. 4, 2021

Related U.S. Application Data

(60) Provisional application No. 62/881,110, filed on Jul. 31, 2019.

(51) Int. Cl.
*B60W 40/08* (2012.01)
*G07C 9/25* (2020.01)
*G06F 16/9035* (2019.01)
*G06F 3/01* (2006.01)

(52) U.S. Cl.
CPC ............. *B60W 40/08* (2013.01); *G06F 3/015* (2013.01); *G06F 16/9035* (2019.01); *G07C 9/257* (2020.01); *B60W 2040/0809* (2013.01); *B60W 2040/0872* (2013.01)

(58) Field of Classification Search
CPC .......................... G06F 16/9035; B60W 40/08
See application file for complete search history.

(56) References Cited

U.S. PATENT DOCUMENTS

| 5,549,118 | A | * | 8/1996 | John | A61B 5/378 |
| | | | | | 600/554 |
| 7,821,382 | B2 | | 10/2010 | Kameyama | |
| 9,836,896 | B2 | | 12/2017 | Zizi et al. | |
| 10,042,993 | B2 | * | 8/2018 | Beigi | G06F 21/32 |
| 2004/0097824 | A1 | * | 5/2004 | Kageyama | B60R 16/0231 |
| | | | | | 340/4.1 |

(Continued)

FOREIGN PATENT DOCUMENTS

WO 2010093116 8/2010

OTHER PUBLICATIONS

Driver authentication using brain waves while route tracing as a mental task (https://www.scitepress.org/Papers/2011/34639/34639.pdf), 2011.

(Continued)

*Primary Examiner* — Jess Whittington
(74) *Attorney, Agent, or Firm* — DINSMORE & SHOHL LLP

(57) ABSTRACT

A method of confirming an identity of a user, including displaying a first visual indicator, where the first visual indicator is flashing at a first frequency to induce a first brainwave activity. The first brainwave activity of the user may be measured by a sensor. The measured first brainwave activity may be compared against a user profile to confirm the identity of the user.

15 Claims, 3 Drawing Sheets

(56) References Cited

U.S. PATENT DOCUMENTS

| | | | | |
|---|---|---|---|---|
| 2011/0040202 | A1* | 2/2011 | Luo | A61B 5/38 |
| | | | | 600/544 |
| 2013/0179087 | A1* | 7/2013 | Garripoli | G06F 3/015 |
| | | | | 702/19 |
| 2014/0022157 | A1* | 1/2014 | Lee | A61B 5/369 |
| | | | | 345/156 |
| 2014/0309806 | A1* | 10/2014 | Ricci | G05D 23/1917 |
| | | | | 701/1 |
| 2015/0277560 | A1* | 10/2015 | Beaty | G06F 3/015 |
| | | | | 345/156 |
| 2015/0338917 | A1* | 11/2015 | Steiner | H04L 9/3271 |
| | | | | 345/156 |
| 2016/0314308 | A1* | 10/2016 | Suzuki | G06F 21/45 |
| 2017/0228526 | A1* | 8/2017 | Cudak | H04L 63/0861 |
| 2018/0046838 | A1* | 2/2018 | Pan | G06V 40/1306 |
| 2018/0137692 | A1* | 5/2018 | Ohmert | G07C 5/006 |
| 2019/0026539 | A1* | 1/2019 | Zhou | G06T 7/136 |
| 2019/0056731 | A1* | 2/2019 | Westbrook | G05D 1/0214 |
| 2019/0131002 | A1* | 5/2019 | Castinado | G16H 40/67 |
| 2019/0143989 | A1 | 5/2019 | Oba | |
| 2019/0216392 | A1* | 7/2019 | Bower | G16H 20/70 |
| 2019/0320978 | A1 | 10/2019 | Lee et al. | |
| 2021/0031778 | A1* | 2/2021 | Farooq | B60K 28/02 |

OTHER PUBLICATIONS

Enhanced vehicular security through brain wave analysis (https://pdfs.semanticscholar.org/bc01/ef05be7ea51d849041fe1db5e96066ef9a85.pdf), Sep. 2016.

Evaluation of the brain wave as biometrics in a simulated driving environment (https:/dl.gi.de/bitstream/handle/20.500.12116/18310/351.pdf?sequence=1), Nov. 12, 2019.

\* cited by examiner

SYSTEMS AND METHODS FOR BRAIN-MACHINE INTERFACES AND EEG-BASED DRIVER IDENTIFICATION

CROSS-REFERENCE TO RELATED APPLICATIONS

This application claims the benefit of U.S. Provisional Application No. 62/881,110, filed Jul. 31, 2019, the entire contents of which is incorporated by reference in its entirety.

TECHNICAL FIELD

The present specification generally relates to brain-machine interface systems and, more specifically, to systems and methods for brain-machine interfaces and EEG-based driver identification for confirmation of user identity.

BACKGROUND

Current security systems for vehicles are used to deter persons who are not the owner or authorized driver of a vehicle from using the vehicle. However, these security systems become useless if an unauthorized user comes into possession of the key or fob of the vehicle. Current security systems do not look at who is operating the vehicle, but only that current user has possession of the key or fob. This could lead to vehicle which are unsecured if their corresponding key is lost or stolen. A form of password or key code may be used to further secure the vehicle, but also suffers from the same issue where an unauthorized user may still use the vehicle if they have the code.

Accordingly, there is a need for alternative identification security systems and methods that can determine the identity of a user prior to allowing access to the vehicle.

SUMMARY

According to a first aspect, a method of confirming an identity of a user, including displaying a first visual indicator, where the first visual indicator is flashing at a first frequency to induce a first brainwave activity. The first brainwave activity of the user may be measured by a sensor. The measured first brainwave activity may be compared against a user profile to confirm the identity of the user.

According to a second aspect, a method of confirming an identity of a user according to the previous aspect, including displaying a second visual indicator, where the second visual indicator is flashing at a second frequency to induce a second brainwave activity. The second brainwave activity of the user may be measured by the sensor. The measured second brainwave activity may be compared against a user profile to confirm the identity of the user.

According to a third aspect, a method of confirming an identity of a user according to any of the previous aspects, wherein the user profile includes a first previously calibrated measured brainwave activity which was induced by displaying the first visual indicator flashing at the first frequency to the user.

According to a fourth aspect, a method of confirming an identity of a user according to any of the previous aspects, wherein the user profile includes a second previously calibrated measured brainwave activity which was induced by displaying the second visual indicator flashing at the second frequency to the user.

According to a fifth aspect, a method of confirming an identity of a user according to any of the previous aspects, wherein the first visual indicator is removed from the user's view prior to displaying the second visual indicator.

According to a sixth aspect, a method of confirming an identity of a user according to any of the previous aspects, wherein the first visual indicator and the second visual indicator are the same visual image flashing at the first frequency when the first visual indicator is displayed and flashing at the second frequency when the second visual indicator is displayed.

According to a seventh aspect, a method of confirming an identity of a user according to any of the previous aspects, wherein the sensor is an electroencephalogram (EEG) sensor.

According to an eighth aspect, a method of confirming an identity of a user in a vehicle may include displaying a first set of visual indicators, wherein each visual indicator of the first set of visual indicators is flashing at a frequency that is different from the remaining visual indicators of the first set of visual indicators, and measuring a brainwave activity of the user by a sensor in response to the user viewing one visual indicator of the first set of visual indicators to determine which visual indicator is viewed by the user. The method further includes displaying a second set of visual indicators, wherein each visual indicator of the second set of visual indicators is flashing at a frequency that is different from the remaining visual indicators of the second set of visual indicators, and measuring the brainwave activity of the user by the sensor in response to the user viewing one visual indicator of the second set of visual indicators to determine which visual indicator is viewed by the user. The method further includes unlocking a first security system level of the vehicle in response to determining that the user looked at a correct visual indicator of the first set of visual indicators and a correct visual indicator of the second set of visual indicators to allow partial access to a plurality of vehicle features.

According to a ninth aspect, a method according to the eighth aspect, wherein the first set of visual indicators and the second set of visual indicators are displayed on a windshield, a rear view mirror, or an interior screen of the vehicle.

According to a tenth aspect, a method according to any of the eighth and ninth aspects, further including displaying at least one additional set of visual indicators after displaying the second set of visual indicators.

According to an eleventh aspect, a method according to any of the eighth through tenth aspects, wherein partial access to the plurality of vehicle features includes HVAC control, infotainment control, or access to online profiles.

According a twelfth aspect, a method according to any of the eighth through eleventh aspects, wherein complete access to the plurality of vehicle features includes allowing movement of the vehicle.

According to a thirteenth aspect, a method according to any of the eighth through twelfth aspects, wherein each of the first set of visual indicators and the second set of visual indicators are shown to the user for a period of time.

According to a fourteenth aspect, an identification system for confirming an identity of a user in a vehicle may include a display arranged within view of the user. A sensor may be arranged with proximity to the head of the user. A processor that, when executing computer readable and executable instructions of the identification system, may cause the identification system to: display a first visual indicator, where the first visual indicator is flashing at a first frequency to induce a first brainwave activity; measure the first brainwave activity of the user by the sensor; compare the measured first brainwave activity against a user profile to confirm the identity of the user; and unlock a first security system level of the vehicle.

According to a fifteenth aspect, an identification system according to the fourteenth aspect, wherein executing computer readable and executable instructions of the identification system further causes the identification system to: display a second visual indicator, wherein the second visual indicator is flashing at a second frequency, different from the first frequency, to induce a second brainwave activity; measure the second brainwave activity of the user by the sensor, compare the measured second brainwave activity against the user profile to confirm the identity of the user, and unlock a second security system level of the vehicle.

According to a sixteenth aspect, an identification system according to the fourteenth or fifteenth aspects, wherein the sensor is an electroencephalogram (EEG) sensor.

According to a seventeenth aspect, an identification system according to any of the fourteenth through sixteenth aspects, wherein the sensor is contactless sensor arranged within the headrest of the vehicle.

According to an eighteenth aspect, an identification system according to any of the fourteenth through seventeenth aspects, wherein the user profile comprises a first previously calibrated measured brainwave activity and a second previously calibrated measured brainwave activity.

According to a nineteenth aspect, an identification system according to any of the fourteenth through eighteenth aspects, wherein the display is a windshield, a rear view mirror, or an interior screen of the vehicle.

According to a twentieth aspect, an identification system according to any of the fourteenth through nineteenth aspects, wherein unlocking of the first security system level allows partial access to the plurality of vehicle features, and unlocking of the second security system level allows complete access to the plurality of vehicle features.

In some embodiments, the visual indicator can flash between different colors, and can minimize visual fatigue by changing a color, width of a border, shape, or pattern at a frequency of the visual indicator.

In some embodiments, a method of confirming a user's identity is provided. The method includes displaying a visual indicator to the user, where the visual indicator is flashing at a frequency. The user's brainwave activity is recorded via sensors arranged on the user, and based on the user's brainwave activity, a user profile is created and stored in the device measuring the brainwave activity. From this point on, whenever a user interfaces with the device, the device will perform the same method as described above in order to measure the user's brainwave activity, and then compare this new brainwave activity to the stored brainwave activity to confirm the identity of the user as the same user as before.

In some embodiments, a driver of an automobile is exposed to a flashing icon in rearview mirror, which is the visual indicator. While viewing the flashing icon, the driver's brainwave is measured by sensors arranged on the driver. Based on the driver's electroencephalogram (EEG) and/or other measured brainwave activity, it can be determined if the driver is looking at the icon, and the driver of the automobile can be identified. Their driver profile can be stored by the vehicle so the driver can be identified during future instances when using the automobile.

In some embodiments, the driver can look at a secret/hidden icon, which may act as an extra layer of security since the driver will be the only one who knows the location of the secret icon. Additionally, in some embodiments, the driver can look at a sequence of patterns to be identified instead of a single logo or icon in order to increase the security of the system. In a non-limiting embodiment where a sequence of icons is used for identification, the driver is able to be identified through the first icon, and limited vehicle functions can be enabled (i.e., audio, air conditioning). After the driver passes the first icon, the second and third icons can enable further vehicle functions (i.e., start engine, access an online shopping account, and the like). As the number of icons increases in the sequence, the more secure the system would be, since each icon can be viewed as a separate lock.

In some embodiments, certain driver profiles can be edited to include speed limiting, volume limits, and territorial limits. For example, an automobile has the profiles of both a parent and a child. The parent edits the child's driver profile so that when the child uses the automobile and is identified by the automobile through the method, the automobile will have pre-set speed and volume limitations which the child cannot change.

In some embodiments, the automobile can send a message to the driver when the automobile enters an area designated as not for kids/higher rate of crime. Additionally, certain patterns of measured brainwave activity can also be an SOS to the police, or enable the automobile to record. These functions can be initiated through measured brainwave activity, where the driver does not need to speak.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
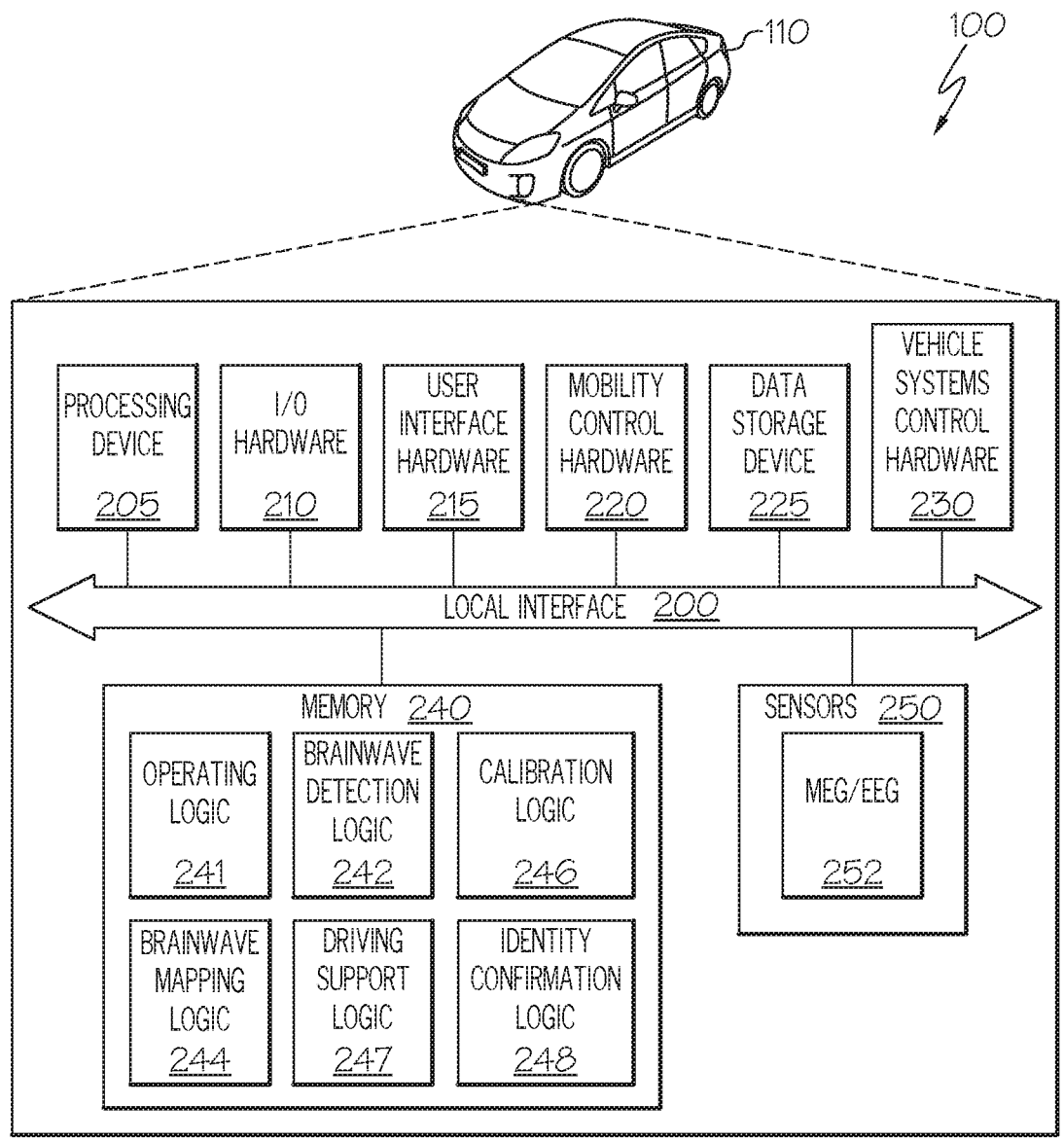
FIG. 1 schematically depicts illustrative hardware components of an illustrative driving support system of a vehicle, according to one or more embodiments shown and described herein.

FIG. 1 generally depicts an embodiment of an identification system for confirming an identity of a user in a vehicle.

The identification system may include a display arranged within view of the user. A sensor may be arranged with proximity to the head of the user. A processor that, when executing computer readable and executable instructions of the identification system, may cause the identification system to: display a first visual indicator, where the first visual indicator is flashing at a first frequency to induce a first brainwave activity; measure the first brainwave activity of the user by the sensor; compare the measured first brainwave activity against a user profile to confirm the identity of the user; and unlock a first security system level of the vehicle. Various embodiments of brain-machine interface systems and methods and EEG-based driver identification systems and methods will be described in greater detail herein.

Although embodiments herein are described in the context of identification systems for automotive vehicles, embodiments are not limited thereto. For example, the identification systems described herein may be configured and compatible for use with various transportation systems, including, for example, motorcycles, bicycles, watercrafts, aircrafts, and/or the like. Other uses should generally be understood and are included within the scope of the present disclosure.

Additionally, although embodiments herein are described in the context of identification systems for allowing access to vehicle features, embodiments are not limited thereto. For example, the identification systems described herein may be configured and compatible for use with unlocking digital accounts, such as an Amazon account, or other security uses. Additional examples include unlocking access to buildings, such as homes and offices. Other uses should generally be understood and are included within the scope of the present disclosure.

Referring now to the drawings, FIG. 1 schematically depicts a non-limiting example of an illustrative identification system 100. In particular, FIG. 1 schematically depicts illustrative hardware components of the identification system 100 that may be used to provide a functionality of the identification system 100 described in further detail herein. Generally, the illustrative identification system 100 depicted in FIG. 1 may be positioned within a vehicle 110 and provide particular use in assisting occupants 12 of the vehicle 110 in controlling the vehicle 110 and/or various vehicle systems of the vehicle 110. However, it should be appreciated that the identification system 100 is not limited to this use and may be used for other purposes without departing from the scope of the present disclosure. For example, the identification system 100 may be used for other purposes as described in more detail herein, such as uploading a stored-user profile of a user 12 seated within the vehicle, identifying potential hazards external to the vehicle 110 for an occupant's awareness, and/or the like.

The example identification system 100 generally includes a non-transitory computer-readable medium containing one or more programming instructions for completing the various processes described herein, which may be embodied as hardware, software, and/or firmware, according to embodiments shown and described herein. While in some embodiments the various components of the identification system 100 may be configured as a general purpose computer with the requisite hardware, software, and/or firmware, in other embodiments, the various components of the identification system 100 may also be configured as a special purpose computer designed specifically for performing the functionality described herein.

Still referring to FIG. 1, the identification system 100 may include a processing device 205, I/O hardware 210, user interface hardware 215, mobility control hardware 220, a data storage device 225, vehicle systems control hardware 230, a non-transitory memory component 240, and one or more sensors 250. A local interface 200, such as a bus or the like, may interconnect the various components. The processing device 205, such as a computer processing unit (CPU), may be the central processing unit of the identification system 100, performing calculations and logic operations to execute a program. The processing device 205, alone or in conjunction with the other components, is an illustrative processing device, computing device, processor, or combination thereof. The processing device 205 may include any processing component configured to receive and execute instructions (such as from the data storage device 225 and/or the memory component 240).

The I/O hardware 210 may communicate information between the local interface 200 and one or more other components of the identification system 100. For example, the I/O hardware 210 may act as an interface between the various components described with respect to FIG. 1 and other components of the identification system 100 and/or vehicle 110, such as user interface hardware 215 that controls information communicated to a user 12 (see FIGS. 3A and 3B) of the vehicle 110, mobility control hardware 220 that control movement and/or steering of the vehicle 110, vehicle systems control hardware 230 that control an operation of various vehicle systems within the vehicle 110, and/or the like. The I/O hardware 210 may be utilized to transmit one or more commands to the other components of the identification system 100 in some embodiments.

Still referring to FIG. 1, the user interface hardware 215 may include any device, mechanism, system, interactive display, and/or various other hardware components for communicating information from the identification system 100 to a user 12 of the vehicle 110. For example, the user interface hardware 215 may include input hardware, such as a touch screen, button, microphone, and/or other device for receiving inputs from a user 12. The user interface hardware 215 may further include display hardware, such as, for example, a monitor, video card, heads-up display, dashboard display, mirror display, and/or other device for sending or presenting visual data to a user.

The mobility control hardware 220 may be one or more hardware components for controlling a movement, power, functionality, or operation of various components of the vehicle 110 that influence a movement and steering of the vehicle 110. For example, the mobility control hardware 220 may include a steering wheel, gas or brake pedal, wheels, and/or the like for controlling a movement, steering, acceleration and/or deceleration of the vehicle 110. Such hardware components may generally be configured to generate and transmit one or more signals to one or more motors coupled to the vehicle 110 to effect movement of the vehicle 110 or the like.

The data storage device 225, which may generally be a storage medium, may contain one or more data repositories for storing data that is received and/or generated. The data storage device 225 may be any physical storage medium, including, but not limited to, a hard disk drive (HDD), solid-state memory, removable storage, and/or the like. While the data storage device 225 is depicted as a local device, it should be understood that the data storage device 225 may be a remote storage device, such as, for example, a server computing device, cloud based storage device, or the like. Illustrative data that may be contained within the data storage device 225 is described below with respect to FIG. 2.

The program instructions contained on the memory component 240 may be embodied as a plurality of software modules, where each module provides programming instructions for completing one or more tasks. For example, FIG. 1 schematically depicts the memory component 240 containing illustrative logic components according to one or more embodiments shown and described herein. The memory component 240 may be configured to store various processing logic, such as, for example, operating logic 241, brainwave detection logic 242, calibration logic 246, brainwave mapping logic 244, driving support logic 247, and/or identity confirmation logic 248 (each of which may be embodied as a computer program, firmware, or hardware, as an example). The operating logic 241 may include an operating system and/or other software for managing components of the identification system 100. The brainwave detection logic 242 may include one or more programming instructions for initiating operation of one or more sensors 250 of the identification system 100 to detect and record brainwave signals (i.e., neural oscillations generated from neural activity in the central nervous system, such as electrical signals transmitted between brain cells) of one or more occupants 12 located within the vehicle 110 and positioned adjacent to the one or more sensors 250.

Still referring to FIG. 1, the brainwave mapping logic 244 may include one or more programming instructions for generating a map of the brainwave signals detected by the one or more sensors 252 and recorded via the brainwave detection logic 242 described above.

Still referring to FIG. 1, the identity confirmation logic 248 may include one or more programming instructions for identifying an identity of a user 12 within the vehicle 110, confirming an authorization to operate the vehicle 110, uploading a stored user profile of the user 12 including various vehicle system preferences particular to the user 12, and the like. As described in more detail herein with respect to FIG. 5, the identity confirmation logic 248 determines an identity of a user 12 of the vehicle 110 by analyzing brainwave signals of the user 12, as detected by the one or more sensors 250 and recorded pursuant to the brainwave detection logic 242. Upon comparing the detected brainwave signals of the user 12 to one or more user profiles including stored brainwave signal data for particular occupants 12, the identity confirmation logic 248 determines whether the detected brainwave signals correspond to a registered user profile. Confirming an identity of a user 12 may permit the user 12 to proceed with operating the vehicle 110, implementing various system setting preferences associated with the registered user profile, and/or the like.

Still referring to FIG. 1, the one or more sensors 250 may generally include the various sensors described herein, including, for example, one or more neuroimaging sensors 252 capable of detecting brainwave signals of a user 12 of the vehicle 110. As discussed in more detail herein, the one or more neuroimaging sensors 252 may comprise any known or yet-to-be-developed magnetoencephalography (MEG) and/or electroencephalogram (EEG) sensors that are capable of detecting the brainwave signals of a user 12 in a non-invasive manner, and in particular without requiring direct physical contact between the sensors 252 and a head of the user 12 (FIG. 5). It should be understood that the one or more neuroimaging sensors 252 may comprise various other non-invasive, contactless sensors that are configured to detect brainwave signals without requiring physical contact, connection, or engagement with the subject being monitored. For example, the one or more sensors 250, and in particular the neuroimaging sensor 252 may receive brainwave signal data and generate one or more signals and/or data to transmit to the processing device 205 for processing the data and generating a brainwave map of the user 12 for purposes of determining a corresponding vehicle support control to initiate (FIG. 4); for determining an identity of a user 12 seated within the vehicle 110 (FIG. 5); and/or the like.

Figure 2:
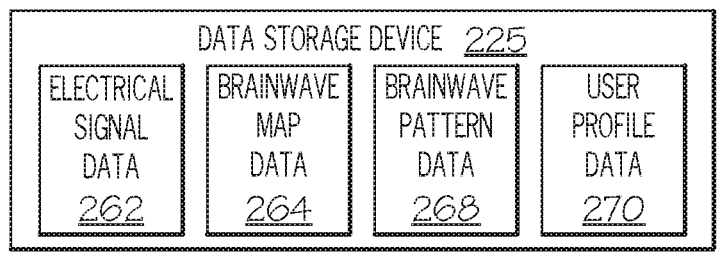
FIG. 2 depicts schematically depicts an illustrative data storage device of the identification system of FIG. 1 containing illustrative data components, according to one or more embodiments shown and described herein.

FIG. 2 schematically depicts a block diagram of various data that may be stored within a storage device (e.g., the data storage device 225) of the identification system 100, a computing device, and/or a vehicle component according to one or more embodiments shown and described herein. The data storage device 225 may include, for example, electrical signal data 262, brainwave map data 264, brainwave pattern data 268, and/or user profile data 270. It should be understood that less, additional, or different data may be stored. Electrical signal data 262 may include, for example, neural oscillation data (i.e., brainwave signal data) detected by the neuroimaging sensor 252 and associated with a particular user 12 seated proximate to the neuroimaging sensor 252. Brainwave map data 264 may generally refer to information relating to sensed characteristics by the one or more neuroimaging sensors 252, such as, for example, a brainwave map generated by the identification system 100, and in particular the brainwave mapping logic 244, based on the electrical signal data 262 collected by the one or more neuroimaging sensors 252 via the brainwave detection logic 242. Brainwave pattern data 268 may further refer to a database of stored information relating to registered brainwave signals (i.e., stored neural oscillations or rhythmic patterns of neural activity) of one or more occupants 12 of the vehicle 110 that have been previously stored in the identification system 100, for purposes of facilitating future instances of identifying a returning user 12 of the vehicle 110. User profile data 270 may refer to a database of stored information relating to particular system setting preferences of various vehicle components or devices, such as, for example, the user interface hardware 215, the vehicle systems control hardware 230, and the like, for a user 12 of the vehicle 110 having a registered user profile stored in the identification system 100 which has been previously calibrated by having the user 12 look at the visual indicators and then recording the brainwave activity.

Figure 3A:
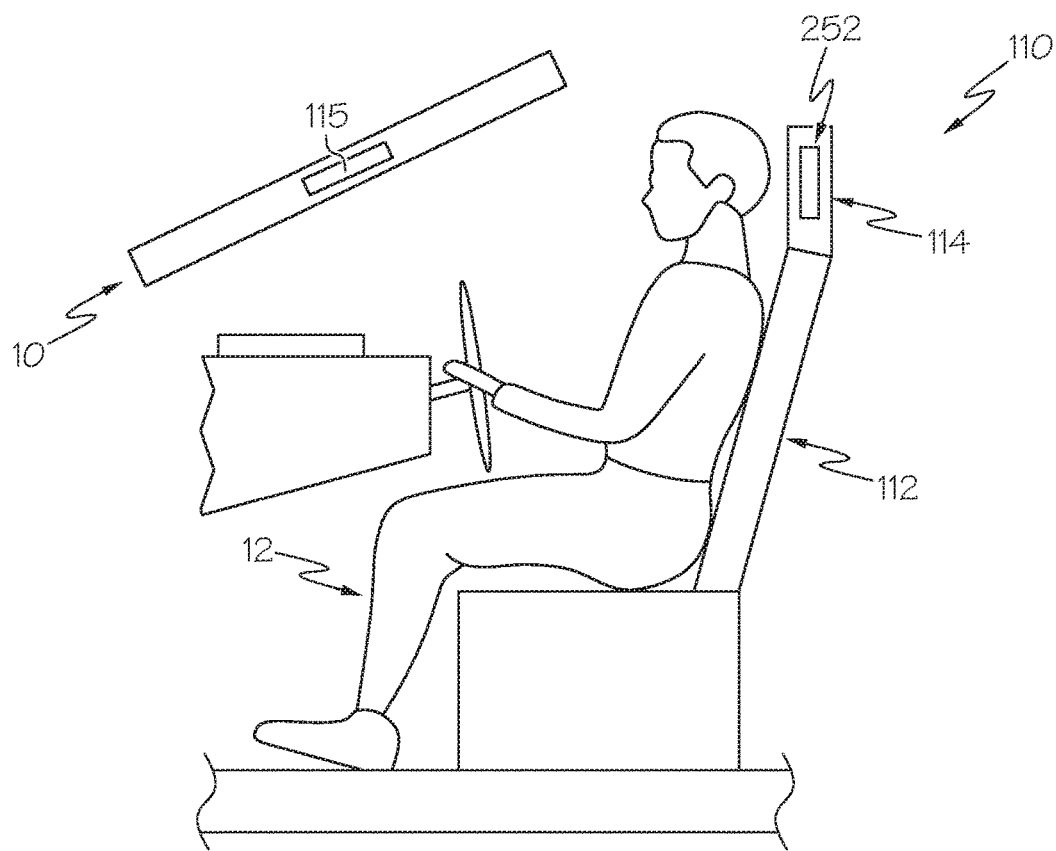
FIG. 3A schematically depicts the identification system of FIG. 1 in the vehicle, according to one or more embodiments shown and described herein.
Figure 3B:
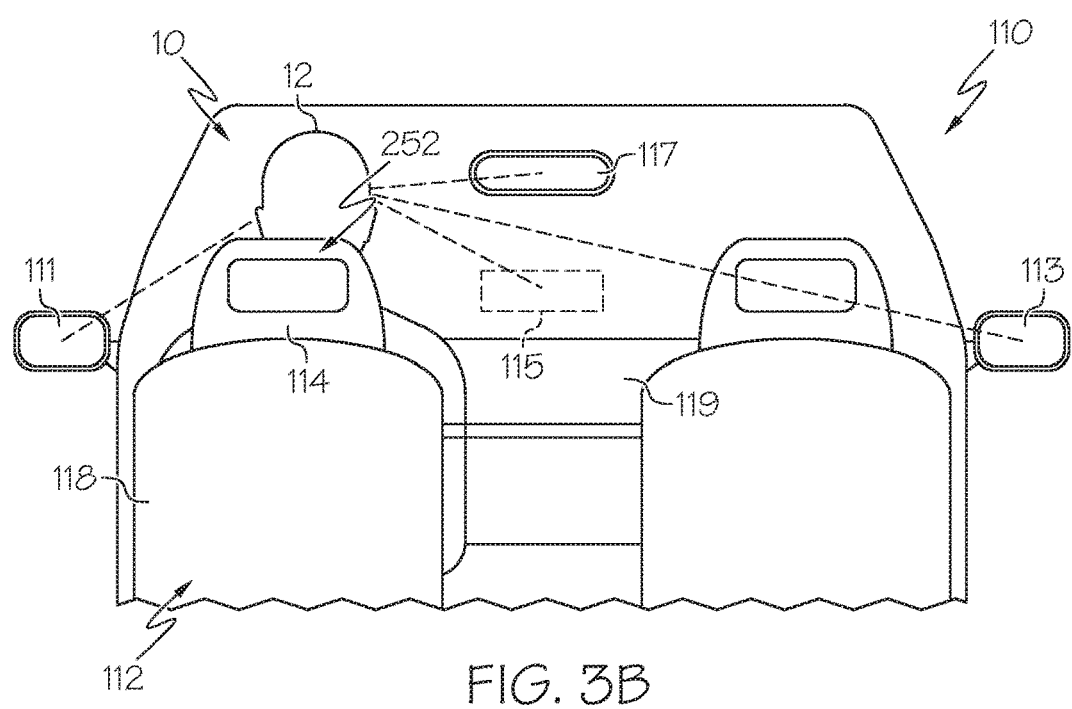
FIG. 3B schematically depicts visual indicators displayed along a vehicle heads-up display and multiple mirrors of the vehicle with the identification system of FIG. 1, according to one or more embodiments shown and described herein.

Referring now to FIGS. 3A and 3B, the visual indicators may be generated along various surfaces of the vehicle 110. As one non-limiting example, the visual indicators are generated on display output hardware, such as, for example, a heads-up display (HUD) of a front windshield 10 of the vehicle 110, a side mirror 111, 113 of the vehicle 110, a rearview mirror 117 of the vehicle 110, a dashboard display 119 of the vehicle 110, side and rear windows of the vehicle 110, and the like. It should be understood that the visual indicators may be provided to a user 12 of the vehicle 110 via various other devices, systems, hardware, and surfaces of the vehicle 110.

Still referring to FIGS. 3A and 3B, sensor 252 may be a contactless sensor arranged within close proximity to the head of user 12. For example, the sensors 252 may be arranged in the headrest 114 of the vehicle 110. In embodiments, the sensor 252 is an electroencephalogram (EEG) sensor or a magnetoencephalography (MEG) sensor. In some embodiments, the sensor is embedded in an object that is worn by the user, such as a hat, a headband, or a helmet.

Figure 4:
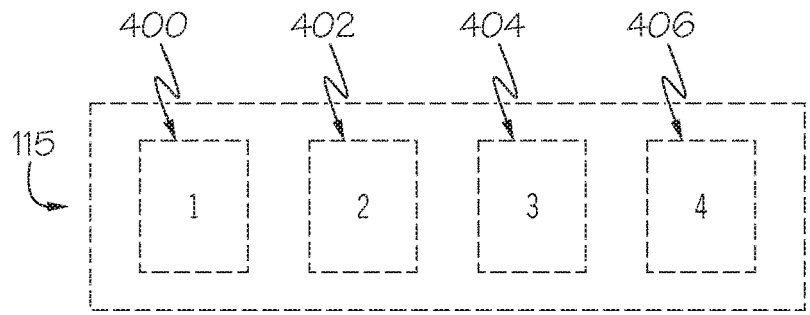
FIG. 4 depicts a detailed view of the visual indicators of FIG. 3B, according to one or more embodiments shown and described herein.
Figure 5:
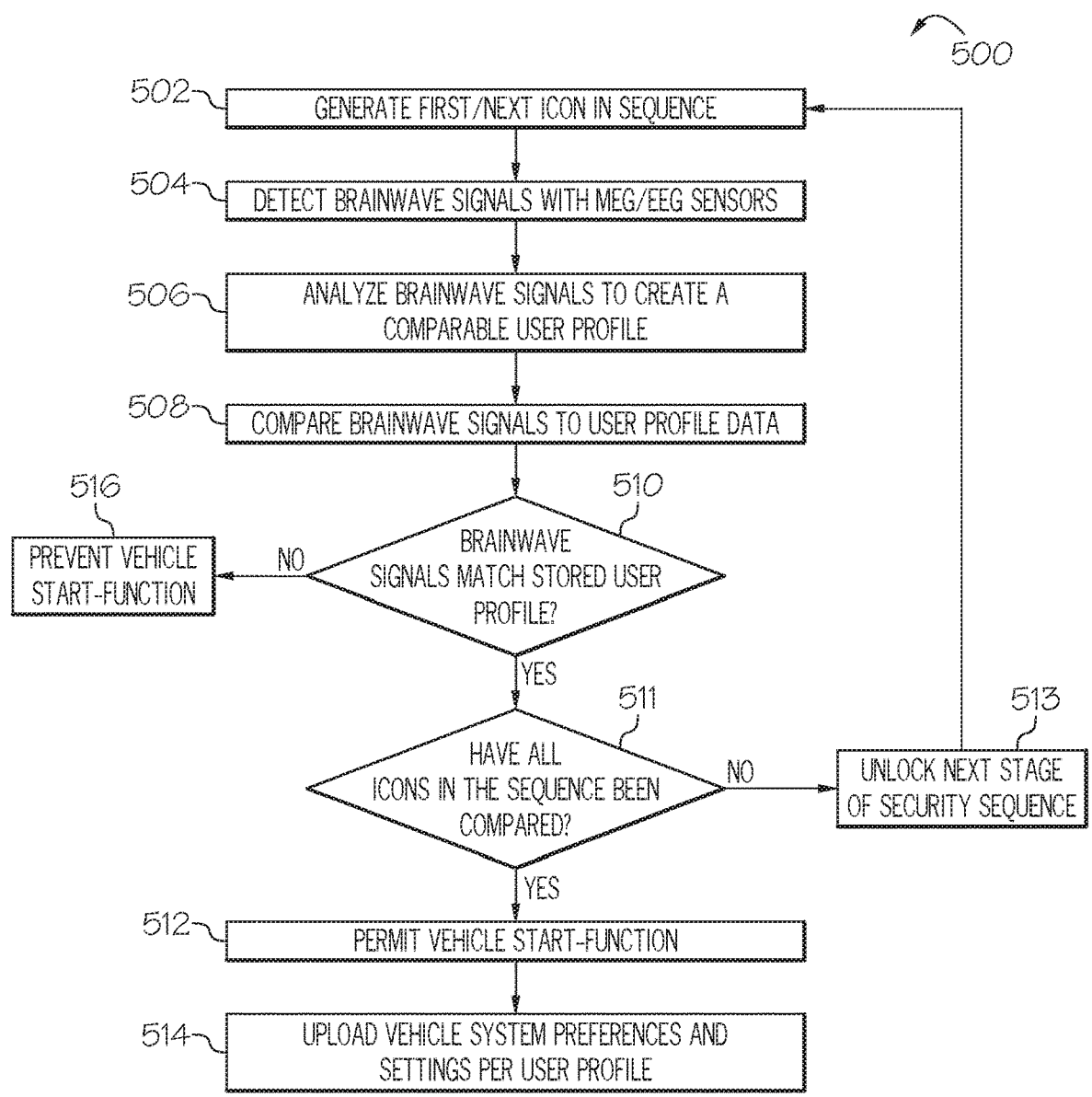
FIG. 5 depicts a flow diagram of another illustrative method of confirming an identity of an occupant of the vehicle with the identification system of FIG. 1, according to one or more embodiments shown and described herein.

Referring now to FIG. 4, an example of visual indicator 115. The visual indicator 115 may include a plurality of visual indicators 400, 402, 404, and 406. Each visual indicator 400, 402, 404, and 406 is projected on the windshield 10 or flashed on a surface at a different frequency. The different frequencies induce a specific brainwave activity which corresponds to each different frequency that is measured by the sensor 252. Even though the current visual indicators 400, 402, 404, and 406 are depicted as numbers, it should be appreciated that the visual indicators 400, 402, 404, and 406 may be any form of visual image, such as everyday objects or letters. However, each visual indicator 400, 402, 404, and 406 may be flashing at a different frequency to induce the proper brainwave activity. For example, visual indicator 400 may be flashing at 10 Hz, visual indicator 402 may be flashing at 20 Hz, visual indicator 404 may be flashing at 30 Hz, and visual indicator 406 may be flashing at 40 Hz.

Still referring to FIG. 4, the visual indicators 400, 402, 404, and 406 may be looked at by a user 12 in a specific order in order to completely unlock all the vehicle features. For example, the user 12 may look at visual indicator 402 first, which unlocks a first security system level (e.g., allowing the user 12 to access the HVAC controls and the infotainment system). The user 12 may then look at the visual indicator 404, unlocking a second security system level (e.g., allowing the user 12 to access an online marketplace account). The user 12 may then look at the visual indicator 400, unlocking a third security system (e.g., allowing for ignition of the vehicle 110).

Still referring to FIG. 4, the visual indicators 400, 402, 404, and 406 may be looked at by a user 12 in combination to unlock a single security system. For example, the user 12 may look at visual indicator 404, then visual indicator 400, then visual indicator 402, where looking at all three visual indicators 400, 402, 406 unlocks a single security system that allows complete access to the vehicle features. Additionally, a secret/emergency visual indicator may be used so that a user 12 may alert emergency services in the event of an emergency. Visual indicator 406 may be used so that when the user 406 looks at visual indicator 406, the police are notified or an emergency situation occurring with the vehicle 110.

In another example, a security system level is unlocked by the user looking at a correct visual indicator in each set of a plurality of sets of visual indicators. In this example, a first set of visual indicators is presented to the user 12 to unlock a security system level. Any number of visual indicators may be included in the first set of visual indicators. As a non-limiting example, the four visual indicators 400, 402, 404, and 406 may be included in the first set. As stated above, each visual indicator 400, 402, 404, and 406 is flashing at a different frequency. The first set of visual indicators is presented for a period of time (e.g., 5 seconds). The user 12 looks at one of the visual indicators in the set and the system records the user's brainwave signal response. The system determines which visual indicator the user is looking at based on the measured brainwave signal response. There is a correct visual indicator that the user must look at to unlock the system security level. Next, a second set of visual indicators is presented with the same or different visual indicators. The visual indicators of the second set may have the same or different frequencies as the visual indicators in the first set. The user 12 looks at one of the visual indicators in the second set and the system records the user's brainwave signal response. The sequence repeats for any number of sets of visual indicators. When the system determines that the user 12 has looked at the correct visual indicator in each set, a system security level is unlocked.

Referring now to FIG. 5, an illustrative method of brainwave signal identification is depicted where an identity of a user 12 of the vehicle 110 may be confirmed, generally designated 500, according to some embodiments. The various steps described with respect to FIG. 5 are merely illustrative, and additional, fewer, or alternative steps are contemplated without departing from the scope of the present disclosure. It should be understood that in one non-limiting example, the process 500 is initiated autonomously without requiring a physical actuation and/or physical contact to confirm an identity of a user 12. In some embodiments, the identification system 100 is not configured to autonomously initiate an identification of a user 12 within the vehicle 110 such that actuation of the process 500 may be required. In addition, the steps described with respect to FIG. 5 are generally completed prior to the vehicle 110 being actively operated (i.e., started).

As one non-limiting example, when a user 12 initially enters into the vehicle 110 an identity of the user 12 may be determined to confirm whether the user 12 is authorized to operate the vehicle 110. In particular, an identity of the user 12 may be determined by the identification system 100 by comparing the brainwave signals of the user 12 presently located within the vehicle 110 to stored brainwave data (i.e., user profile data 270) corresponding to approved operators of the vehicle 110. The identification system 100 may include one or more user profiles that, upon determining an identity of a user 12 of the vehicle 110 based on a comparative analysis of the brainwave signals of the user 12 to the registered brainwave signals stored in one or more user profiles, preprogrammed vehicle system settings may be applied to the various components of the vehicle 110 to promote a convenience and comfort of operating the vehicle 110. The user profiles may be created by a calibration process whereby a user views sample patterns while the system collects electrical signal data. From the calibration data, user profiles are created. It is noted that each person has a unique response to a pattern at a frequency, which enables the person's response to be used as an authentication mechanism.

In particular, when initially entering the vehicle 110, the user 12 may be positioned on the seat 112 with a head of the user 12 located relatively proximate to the headrest 114 of the seat 112. The user 12 is exposed to visual stimulation and that visual stimulation elicits unique and distinguishable neural activity patterns in the visual cortex of user 12. The brainwave signals of the user 12 may be detected by the identification system 100 as visual indicators are generated within the vehicle 110 by the identification system 100 via sensors 252.

Still referring to FIG. 5, at step 502, the one or more programming instructions included in the memory component 240, such as the driving support logic 247, when executed by the processing device 205, causes the processing device 205 to generate one or more visual indicators/icons within the vehicle 110. In some embodiments, a sequence of icons may be used to increase the level of security of the vehicle 110, with each icon unlocking features of the vehicle. For example, unlocking the first icon may activate the radio and air conditioning, while the second icon way unlock access to start the vehicle. In particular, the driving support logic 247 causes the processing device 205 to generate the one or more visual indicators at one or more locations of the vehicle 110. For instance, the one or more visual indicators may be generated via the user interface hardware 215, the vehicle systems control hardware 230, and the like. Further, the driving support logic 247 causes the processing device 205 to generate the one or more visual indicators at predetermined frequencies that vary relative to one another such that the visual indicators are at least partially distinct from one another. It should be understood that the visual indicators may be generated along various surfaces of the vehicle 110 at a location where the indicator may be identified by a user 12, similar to the locations of the vehicle 110 described above and shown in FIG. 5, such as, for example, a rearview mirror 117. Additionally, the icon generated by the processing device 205 may be a secret or hidden icon which only the driver knows of its location. It should be understood that the visual indicators may be provided to a user 12 of the vehicle 110 via various other devices, systems, hardware, and surfaces of the vehicle 110. In some embodiments, the step 502 may include showing the user 12 various visual indicators in sequence in order to increase the security of the method 500, where each visual indicator acts as an individual lock.

At step 504, the one or more programming instructions included in the memory component 240, such as the brainwave detection logic 242, when executed by the processing device 205, causes the processing device 205 to initiate the one or more sensors 252 capable of sensing brainwave signals from the user 12. In particular, the sensors 252 of the identification system 100 actively detects any brainwave signals within a detection field of the sensors 252. The brainwave detection logic 242, when executed by the processing device 205, causes the processing device 205 to record the brainwave signals and store the corresponding electrical signal data 262 in the data storage device 225 of the identification system 100. This storage of brainwave signals occurs simultaneously while the user 12 is looking at the icon in order to produce the correct brainwave signals to unlock the feature of the vehicle 110.

Referring still to FIG. 5, at step 506, the driving support logic 247, when executed by the processing device 205, causes the processing device 205 to analyze the electrical signal data 262 detected from the user 12 to initially determine whether the generated icon was identified by the user 12. For example, if an icon is generated along the rearview mirror 117 of the vehicle 110, the visual indicator will be displayed at a predetermined frequency thereon. Accordingly, the brainwave signals originating from the user 12 will generate at least an electrical signal at the predetermined frequency of the visual indicator observed by the user 12 when the user 12 detects and processes the visual indicator. In other words, the processing device 205 when executing the identity confirmation logic 248 analyzes the electrical signal data 262 to identify whether an electrical signal at the predetermined frequency of the respective visual indicator is included therein. Further at step 506, if this is the occupant's 12 first time within the vehicle 110, then their user profile can be saved and stored within the storage 240 for future use.

At step 508, the identity confirmation logic 248 causes the processing device 205 to compare the relative electrical signal data 262 of the user 12 to the user profile data 270 stored within the data storage device 225 to determine whether the user 12 of the vehicle 110 is known. In particular, as briefly described above, the user profile data 270 includes stored brainwave data corresponding to approved occupants 12 of the vehicle 110 such that the identification system 100 includes one or more registered user profiles. Accordingly, the electrical signal data 262 of the user 12 positioned within the vehicle 110, and in particular the surrounding electrical data 262 relative to the reference indicator (i.e., the brainwave signal corresponding to the predetermined frequency within the electrical signal data 262) is analyzed in comparison to the user profile data 270.

As described above, the user profile for the current user 12 has been previously stored in the memory 240.

Referring still to FIG. 5, at step 510, the identity confirmation logic 248 causes the processing device 205 to determine whether the electrical signal data 262 of the user 12 within the vehicle 110 is similar to at least one of the one or more user profiles stored in the user profile data 270. In particular, the identity confirmation logic 248 of the identification system 100 determines whether the user 12 has a registered user profile by initially aligning the corresponding electrical signal data at the predetermined frequency of the electrical signal data 262 to an identical electrical signal data at the same predetermined frequency from each of the one or more user profiles in the user profile data 270. In this instance, by aligning the electrical signal data 262 of the user 12 to the electrical signal data included in each of the one or more user profiles of the user profile data 270, the surrounding electrical signal data 262 of the user 12 relative to the signal at the predetermined frequency may be compared to the surrounding electrical signal data in each of the one or more user profiles of the user profile data 270.

At step 511, the identity confirmation logic 248 of the identification system 100 determines whether all of the icons have been compared to user profiles stored in the memory 240. If there is still an icon to be compared, then the steps 502 through 511 will be repeated with the new icon being transmitted to the user 12.

At step 513, prior to the steps 502 through 511 being repeated with the next icon in the security sequence, the current stage of security which corresponded to the recently unlocked icon will be disabled. For example, in some embodiments, one the first icon is unlocked, an occupant may be able to access the audio system and air conditioning of the vehicle 110. However, the vehicle 110 will still remain turned off until the second icon is also unlocked by repeating the steps 502 through 511.

At step 512, upon determining that an identity of the user 12 within the vehicle 110 matches at least one of the user profiles stored within the user profile data 270 based on the comparative analysis of the brainwave signals of the user 12 to the registered brainwave signals stored in the one or more user profiles of the user profile data 270 as described above, and all icons contained within the security sequence have been unlocked, the identity confirmation logic 248 causes the processing device 205 to permit a start-function of the vehicle 110. Additionally, at step 514, the identity confirmation logic 248 causes the processing device 205 to upload preprogrammed vehicle system settings to be applied to the various components of the vehicle 110. For example, each of the one or more user profiles stored in the user profile data 270 may include user-specified preferences and settings for the user interface hardware 215 of the vehicle 110, the vehicle systems control hardware 230, and the like. The preprogrammed settings and/or preferences may be autonomously uploaded once an identity of the user 12 is confirmed and the user profile is applied to promote a convenience and comfort for the user 12 in operating the vehicle 110.

Still referring to FIG. 5, alternatively, at step 516, in response to determining at step 510 that an identity of the user 12 within the vehicle 110 does not match at least one of the user profiles stored within the user profile data 270 based on the comparative analysis of the brainwave signals of the user 12 to the registered brainwave signals stored in the one or more user profiles of the user profile data 270, the identity confirmation logic 248 causes the processing device 205 to inhibit, prevent, and/or lock a start-function of the vehicle 110. In this instance, the user 12 within the vehicle 110 may not be identified as a registered user of the vehicle 110 such that the identification system 100 determines that the user 12 is not authorized to operate the vehicle 110.

It should now be understood that embodiments described herein are directed to an identification system for confirming an identity of a user in a vehicle. The identification system may include a display arranged within view of the user. A sensor may be arranged with proximity to the head of the user. A processor that, when executing computer readable and executable instructions of the identification system, may cause the identification system to: display a first visual indicator, where the first visual indicator is flashing at a first frequency to induce a first brainwave activity; measure the first brainwave activity of the user by the sensor; compare the measured first brainwave activity against a user profile to confirm the identity of the user; and unlock a first security system level of the vehicle.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of confirming an identity of a user, comprising:
    displaying a first visual indicator, wherein the first visual indicator is flashing at a first frequency to induce a first brainwave activity;
    measuring the first brainwave activity of the user by a sensor;
    comparing the first brainwave activity against a user profile to confirm the identity of the user;
    displaying a second visual indicator, wherein the second visual indicator is flashing at a second frequency, different from the first frequency, to induce a second brainwave activity;
    measuring the second brainwave activity of the user by the sensor;
    comparing the second brainwave activity against the user profile to confirm the identity of the user, and
    unlocking a security system level of a vehicle responsive to the user viewing the first visual indicator and the second visual indicator in combination, wherein
    the first visual indicator and the second visual indicator are at separate locations, wherein the separate locations are located at a windshield, a rear view mirror, or an interior screen of the vehicle, and
    the security system level permits a start-function of the vehicle.

2. The method of claim 1, wherein the user profile comprises a first previously calibrated measured brainwave activity which was induced by displaying the first visual indicator flashing at the first frequency to the user.

3. The method of claim 2, wherein the user profile comprises a second previously calibrated measured brainwave activity which was induced by displaying the second visual indicator flashing at the second frequency to the user.

4. The method of claim 3, wherein the first visual indicator is deactivated prior to displaying the second visual indicator.

5. The method of claim 4, wherein the first visual indicator and the second visual indicator are the same visual image flashing at the first frequency when the first visual indicator is displayed and flashing at the second frequency when the second visual indicator is displayed.

6. The method of claim 1, wherein the sensor is an electroencephalogram (EEG) sensor.

7. A method of confirming an identity of a user in a vehicle, the method comprising:
    displaying a first set of visual indicators, wherein each visual indicator of the first set of visual indicators is flashing at a frequency that is different from remaining visual indicators of the first set of visual indicators;
    measuring a brainwave activity of the user by a sensor in response to the user viewing one visual indicator of the first set of visual indicators to determine which visual indicator is viewed by the user;
    displaying a second set of visual indicators, wherein each visual indicator of the second set of visual indicators is flashing at a frequency that is different from the remaining visual indicators of the second set of visual indicators;
    measuring the brainwave activity of the user by the sensor in response to the user viewing one visual indicator of the second set of visual indicators to determine which visual indicator is viewed by the user;
    unlocking a first security system level of the vehicle in response to determining that the user looked at a correct visual indicator of the first set of visual indicators and a correct visual indicator of the second set of visual indicators to allow a start function of the vehicle, wherein
    the first visual indicator and the second visual indicator are at separate locations located at a windshield, a rear view mirror, or an interior screen of the vehicle,.

8. The method of claim 7, further comprising displaying at least one additional set of visual indicators after displaying the second set of visual indicators.

9. The method of claim 7, wherein the partial access to the plurality of vehicle features includes HVAC control, infotainment control, or access to online profiles.

10. The method of claim 7, wherein complete access to the plurality of vehicle features includes allowing movement of the vehicle.

11. The method of claim 7, wherein each of the first set of visual indicators and the second set of visual indicators are shown to the user for a period of time.

12. An identification system for confirming an identity of a user in a vehicle, comprising:
    a display arranged within view of the user;
    a sensor arranged with proximity to the head of the user;
    a processor that, when executing computer readable and executable instructions of the identification system, causes the identification system to:
        display a first visual indicator, wherein the first visual indicator is flashing at a first frequency to induce a first brainwave activity;
        measure the first brainwave activity of the user by the sensor;
        compare the first brainwave activity against a user profile to confirm the identity of the user;
        displaying a second visual indicator, wherein the second visual indicator is flashing at a second frequency, different from the first frequency, to induce a second brainwave activity;
        measuring the second brainwave activity of the user by the sensor;
        comparing the second brainwave activity against the user profile to confirm the identity of the user, and unlocking a security system level of a vehicle responsive to the user viewing the first visual indicator and the second visual indicator in combination, wherein the first visual indicator and the second visual indicator are at separate locations, wherein the separate locations are located at a windshield, a rear view mirror, or an interior screen of the vehicle, and the security system level permits a start-function of the vehicle.

13. The identification system of claim 12, wherein the sensor is an electroencephalogram (EEG) sensor.

14. The identification system of claim 13, wherein the sensor is contactless sensor arranged within a headrest of the vehicle.

15. The identification system of claim 12, wherein the user profile comprises a first previously calibrated measured brainwave activity and a second previously calibrated measured brainwave activity.

* * * * *